(12) United States Patent
Chen

(10) Patent No.: US 8,631,542 B2
(45) Date of Patent: Jan. 21, 2014

(54) TORQUE-ADJUSTABLE HINGE

(75) Inventor: Ching-Yao Chen, Taoyuan (TW)

(73) Assignee: Yuan Deng Metals Industrial Co., Ltd., Taoyuan (TW)

( * ) Notice: Subject to any disclaimer, the term of this patent is extended or adjusted under 35 U.S.C. 154(b) by 1 day.

(21) Appl. No.: 13/293,048

(22) Filed: Nov. 9, 2011

(65) Prior Publication Data

US 2012/0204380 A1    Aug. 16, 2012

(51) Int. Cl.
    *E05D 11/08*    (2006.01)
(52) U.S. Cl.
    USPC .................................. 16/342; 16/337; 16/319
(58) Field of Classification Search
    USPC ..................... 16/319, 337, 342, 267, 321, 335
    See application file for complete search history.

(56) References Cited

U.S. PATENT DOCUMENTS

| 5,491,874 | A * | 2/1996 | Lowry et al. ..................... | 16/342 |
| 8,074,322 | B2 * | 12/2011 | Wang et al. ..................... | 16/342 |
| 2002/0198016 | A1 | 12/2002 | Gupte | |
| 2006/0265839 | A1 * | 11/2006 | Lu ................................... | 16/342 |
| 2006/0272128 | A1 * | 12/2006 | Rude .............................. | 16/342 |
| 2006/0272129 | A1 * | 12/2006 | Rude et al. ...................... | 16/342 |
| 2010/0064475 | A1 * | 3/2010 | Wang et al. ..................... | 16/337 |

FOREIGN PATENT DOCUMENTS

| CN | 2792111 | 6/2006 |
| CN | 2828418 | 10/2006 |
| EP | 1670217 | 6/2006 |
| JP | 2001329735 | 11/2001 |
| JP | 2002327733 | 11/2002 |
| TW | M350627 | 2/2009 |
| TW | M380402 | 5/2010 |

OTHER PUBLICATIONS

Abstract of TWM380402, May 11, 2010.
Abstract of TWM350627, Feb. 11, 2009.
Abstract of JP2002327733, Nov. 15, 2002.
Abstract of JP2001329735, Nov. 30, 2001.
Abstract of EP1670217, Jun. 14, 2006.
Abstract of CN2828418, Oct. 18, 2006.
Abstract of CN2792111, Jun. 28, 2006.

* cited by examiner

*Primary Examiner* — Jeffrey O Brien

(57) ABSTRACT

A hinge includes a pivot shaft defining a friction surface and a positioning surface on the periphery thereof in such a manner that the radius between the center of axis of the pivot shaft and the friction surface is greater than the radius between the center of axis of the pivot shaft and the positioning surface, an upright bearing portion extended from one side of the base portion, a circularly curved constraint portion, an elastic buffer portion connected between the upright bearing portion and the circularly curved constraint portion, an opening defined between the free end of the circularly curved constraint portion and the base portion remote from the upright bearing portion and a flexible space defined between the elastic buffer portion and the friction surface for absorbing stress generated upon displacement of the circularly curved constraint portion due to rotation of the pivot shaft relative to the knuckle.

3 Claims, 4 Drawing Sheets

TORQUE-ADJUSTABLE HINGE

BACKGROUND OF THE INVENTION

1. Field of the Invention

The present invention relates to hinges and more particularly, to a hinge, which is capable of absorbing stress, avoiding component damage due to stress concentration.

2. Description of the Related Art

Hinges are intensively used in many objects in our daily life. For examples, hinges are commonly used in notebook computers, electronic dictionaries, PDAs and many other electronic devices to connect two solid members, for example, the base member and the cover member, allowing only a limited angle of rotation between them.

A conventional hinge 9, as shown in FIGS. 4 and 5, comprises a knuckle 91 and a pivot shaft 92. The knuckle 91 comprises a flat base portion 911, an upright bearing portion 912 extended from one side of the flat base portion 911, and a constraint portion 913 circularly curved and extended from the end of the upright bearing portion 912 opposite to the flat base portion 911. The pivot shaft 92 is rotatably inserted through the knuckle 91, defining a flat positioning face 921. When rotating the pivot shaft 92 to the angle where the flat positioning face 921 is abutted against the flat base portion 911, as shown in FIG. 5, the pivot shaft 92 is firmly kept in position subject to the pressure of the constraint portion 913. When rotating the pivot shaft 92 to move the flat positioning face 921 away from the flat base portion 911, the pivot shaft 92 imparts a pressure to the constraint portion 913 in direction away from the flat base portion 911. At this time, a stress is produced and concentrated on the connection area between the upright bearing portion 912 and the constraint portion 913. However, as the connection area between the upright bearing portion 912 and the constraint portion 913 is stopped against the periphery of the pivot shaft 92, it is not movable to absorb or release the stress and may break easily after a long use.

SUMMARY OF THE INVENTION

The present invention has been accomplished under the circumstances in view. It is the main object of the present invention to provide a hinge, which disperses the stress during operation, avoiding stress concentration and component damage.

To achieve this and other objects of the present invention, a hinge comprises a pivot shaft and a knuckle respectively affixed to two plate members of a device and biasable relative to each other between a close position and an open position. The pivot shaft defines a friction surface and a positioning surface on the periphery thereof. The radius between the center of axis of the pivot shaft and the friction surface is greater than the radius between the center of axis of the pivot shaft and the positioning surface. The knuckle surrounds the pivot shaft, comprising a base portion for stopping against the positioning surface of the pivot shaft to hold the pivot shaft in position, an upright bearing portion extended from one side of the base portion, a circularly curved constraint portion, an elastic buffer portion connected between the upright bearing portion and the circularly curved constraint portion, an opening defined between the free end of the circularly curved constraint portion and the base portion remote from the upright bearing portion and a flexible space defined between the elastic buffer portion and the friction surface for absorbing stress generated upon displacement of the circularly curved constraint portion due to rotation of the pivot shaft relative to the knuckle.

DETAILED DESCRIPTION OF THE PREFERRED EMBODIMENT

Figure 1:
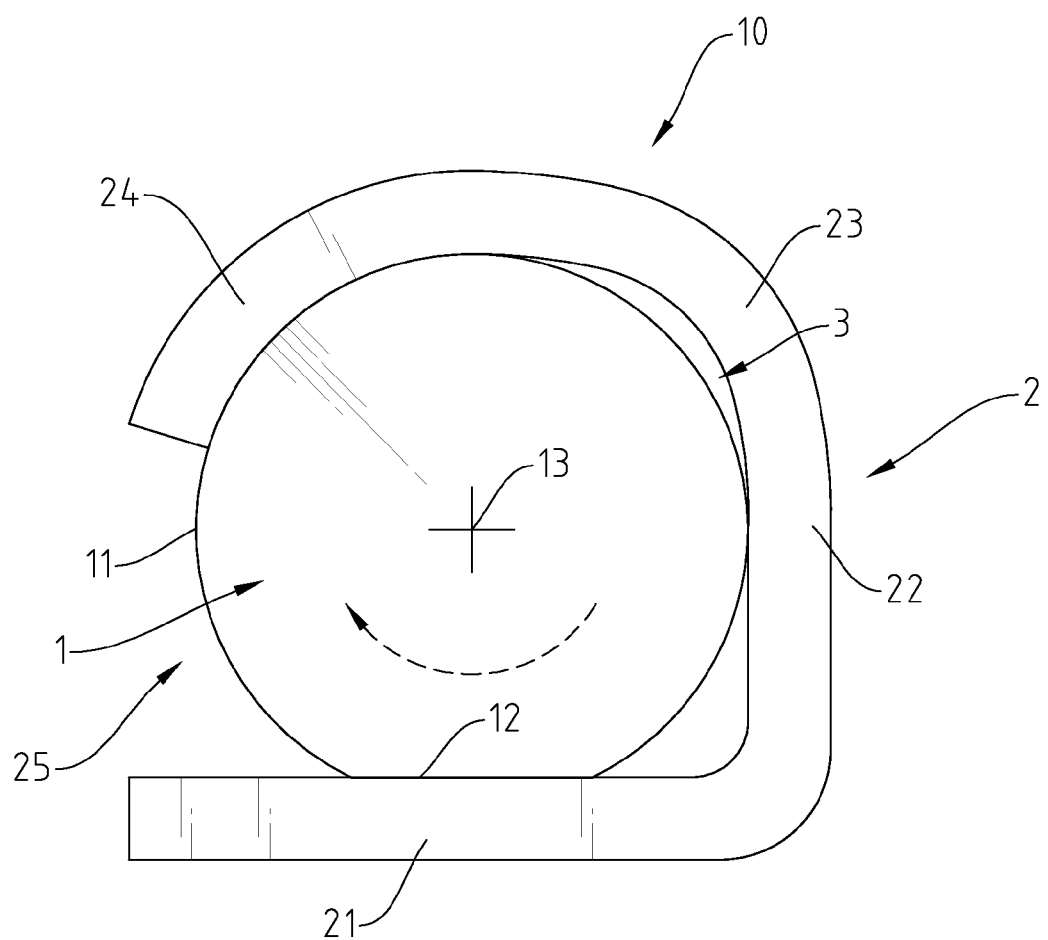
FIG. 1 is a schematic side plain view of a hinge in a close position in accordance with the present invention.
Figure 2:
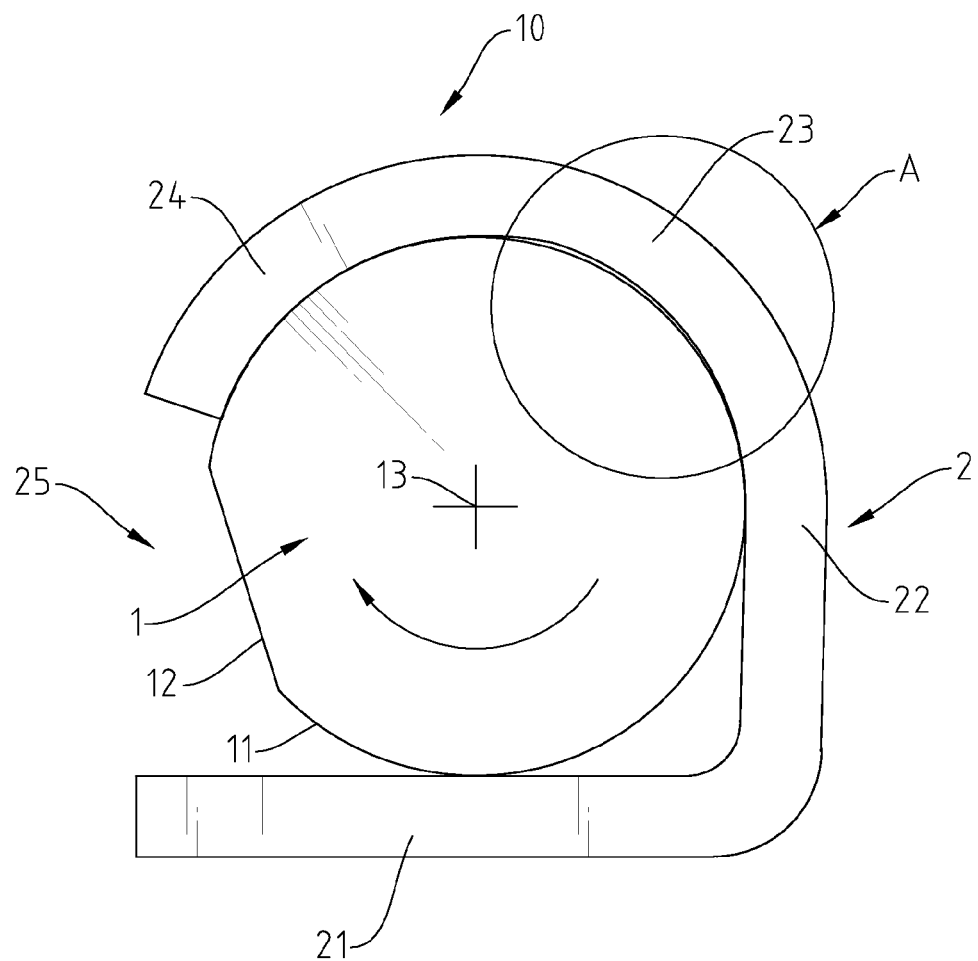
FIG. 2 corresponds to FIG. 1, illustrating the pivot shaft rotated toward an open position.

Referring to FIGS. 1 and 2, a hinge 10 in accordance with the present invention is shown comprising a pivot shaft 1 affixed to a first plate member (not shown) and a knuckle 2 affixed to a second plate member (not shown).

The periphery of the pivot shaft 1 defines a circularly curved friction surface 11 and a flat positioning surface 12. The radius between the center of axis 13 of the pivot shaft 1 and the circularly curved friction surface 11 is greater than the radius between the center of axis 13 of the pivot shaft 1 and the flat positioning surface 12.

The knuckle 2 comprises a flat base portion 21, an upright bearing portion 22 extended from one side of the flat base portion 21, a circularly curved constraint portion 24, a circularly curved elastic buffer portion 23 connected between the upright bearing portion 22 and the circularly curved constraint portion 24, and an opening 25 defined between the free end of the circularly curved constraint portion 24 and the flat base portion 21 remote from the upright bearing portion 22.

During installation of the hinge, the pivot shaft 1 is inserted through the knuckle 2, enabling the knuckle 2 to surround the periphery of the pivot shaft 1. At this time, the flat base portion 21 of the knuckle 2 is disposed at the bottom side of the pivot shaft 1 and facing toward the flat positioning surface 12; the elastic buffer portion 23 and circularly curved constraint portion 24 of the knuckle 2 are disposed at the other side, i.e., the top side of the pivot shaft 1 remote from the flat base portion 21; the flat base portion 21, upright bearing portion 22 and circularly curved constraint portion 24 of the knuckle 2 are respectively abutted against the periphery of the pivot shaft 1. Further, the elastic buffer portion 23 is circularly curved. The curvature of the elastic buffer portion 23 is smaller than the curvature of the circularly curved friction surface 11 of the pivot shaft 1. Thus, a flexible space 3 is defined between the elastic buffer portion 23 and the circularly curved friction surface 11.

Referring to FIG. 1 again, when the hinge 10 is in the close status, the flat base portion 21 of the knuckle 2 is abutted against the flat positioning surface 12 of the pivot shaft 1 and kept in position. As the circularly curved constraint portion 24 of the knuckle 2 is stopped against the circularly curved friction surface 11 to impart a downward pressure to the pivot shaft 1 against the direction of rotation of the pivot shaft 1 (see the imaginary arrowhead sign in FIG. 1), the pivot shaft 1 can be held steadily in this closed position.

Figure 3:
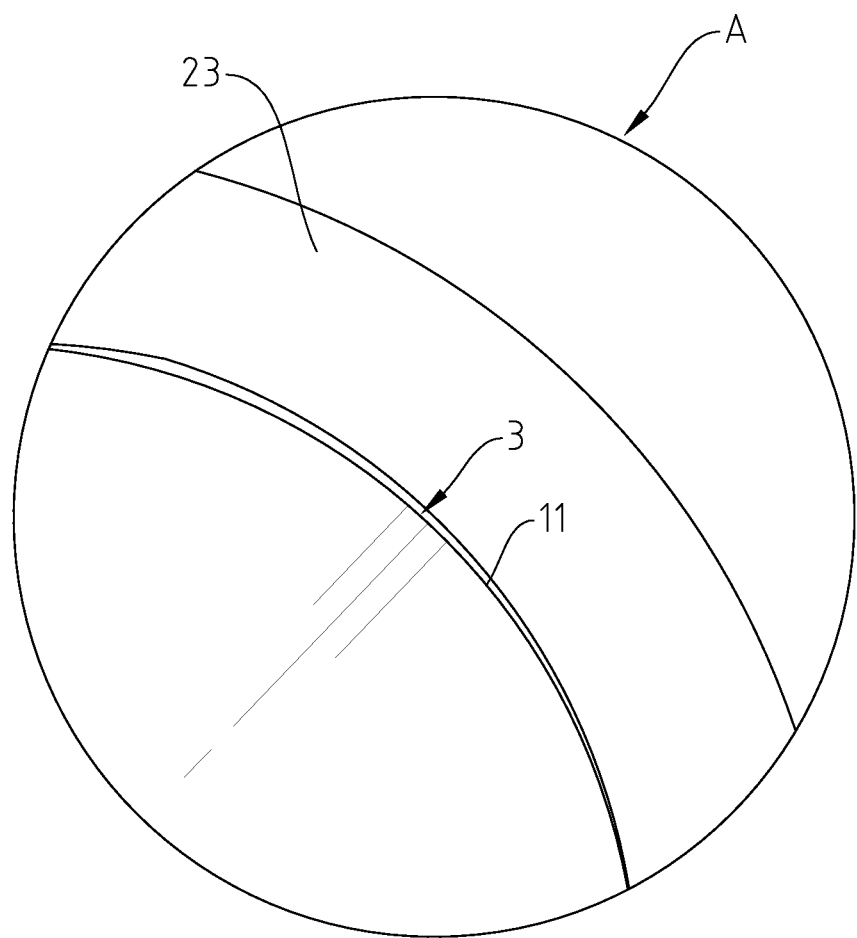
FIG. 3 is an enlarged view of Part A of FIG. 2.
Figure 4:
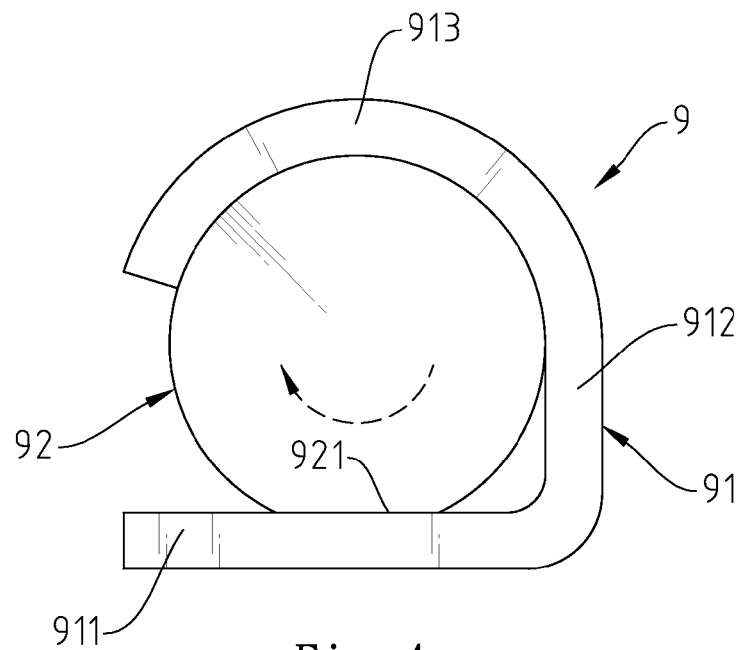
FIG. 4 is a schematic side plain view of a hinge in a close position according to the prior art.
Figure 5:
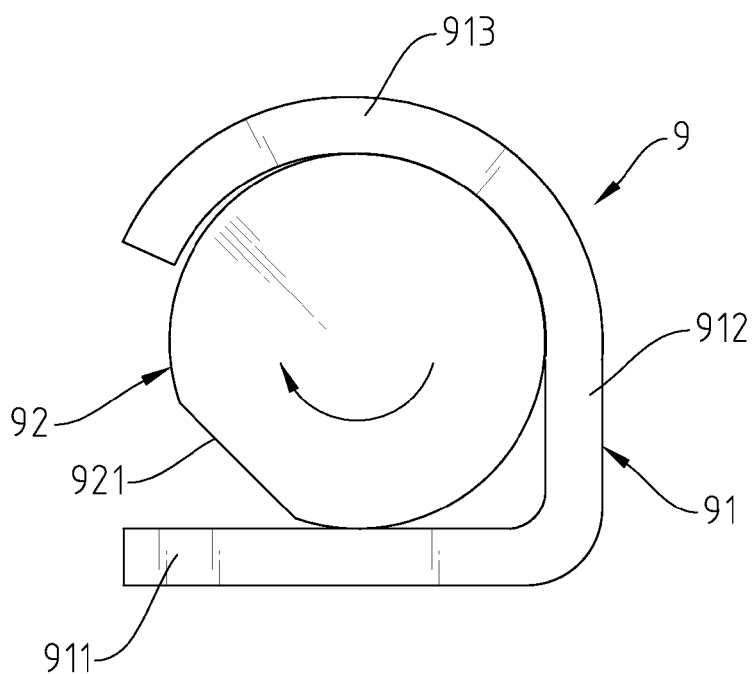
FIG. 5 corresponds to FIG. 4, illustrating the pivot shaft rotated toward an open position.

Referring to FIG. 2 and FIG. 3, when rotating the pivot shaft 1 (see the rotating direction of the solid arrowhead sign in FIG. 2), the flat positioning surface 12 of the pivot shaft 1 will be moved away from the flat base portion 21 of the knuckle 2. As the radius between the center of axis 13 of the pivot shaft 1 and the circularly curved friction surface 11 is greater than the radius between the center of axis 13 of the pivot shaft 1 and the flat positioning surface 12, the circularly curved constraint portion 24 of the knuckle 2 will be forced by the pivot shaft 1 to displace in direction away from the flat base portion 21 of the knuckle 2 when the flat positioning surface 12 of the pivot shaft 1 is moved away from the flat base portion 21 of the knuckle 2. At this time, the flexible space 3 that is defined between the elastic buffer portion 23 and the circularly curved friction surface 11 absorbs the stress generated due to displacement of the circularly curved constraint portion 24. Further, as the elastic buffer portion 23 is circularly curved, the stress absorbed by the flexible space 3 can be evenly distributed through the whole elastic buffer portion 23, avoiding component damage due to stress concentration.

In conclusion, the circularly curved elastic buffer portion 23 of the knuckle 2 of the hinge in accordance with the present invention defines with the circularly curved friction surface 11 of the pivot shaft 1 a flexible space 3 that effectively absorbs the stress generated due to displacement of the circularly curved constraint portion 24 of the knuckle 2 upon rotation of the pivot shaft 1 relative to the knuckle 2 from the close position toward the open position, avoiding component damage due to stress concentration.

What is claimed is:

1. A hinge, comprising:
   a pivot shaft defining a friction surface and a positioning surface on the periphery thereof, a radius between a center of axis of said pivot shaft and said friction surface being greater than a radius between the center of axis of said pivot shaft and said positioning surface; and
   a knuckle surrounding said pivot shaft, said knuckle comprising a base portion for stopping against said positioning surface of said pivot shaft to hold said pivot shaft in position, an upright bearing portion extended from one side of said base portion, a circularly curved constraint portion, an elastic buffer portion connected between said upright bearing portion and said circularly curved constraint portion, an opening defined between a free end of said circularly curved constraint portion and said base portion remote from said upright bearing portion and a flexible space defined between said elastic buffer portion and said friction surface for absorbing stress generated upon displacement of said circularly curved constraint portion due to rotation of said pivot shaft relative to said knuckle;
   wherein said friction surface of said pivot shaft and said elastic buffer portion of said knuckle are circularly curved, the curvature of said elastic buffer portion being smaller than the curvature of said friction surface to define the flexible space, and wherein the flexible space is present both when the positioning surface abuts the base portion and does not abut the base portion, the flexible space being reduced in size when the positioning surface does not abut the base portion as compared to when the positioning surface abuts the base portion.

2. The hinge as claimed in claim 1, wherein said positioning surface of said pivot shaft is a flat surface, and said base portion of said knuckle is a flat member.

3. The hinge as claimed in claim 1, wherein said circularly curved constraint portion and said elastic buffer portion of said knuckle are disposed at one side of said pivot shaft opposite to said base portion.

* * * * *